J. Burnite.
Wind Wheel.
Nº 13,969.
Patented Dec. 18, 1855.
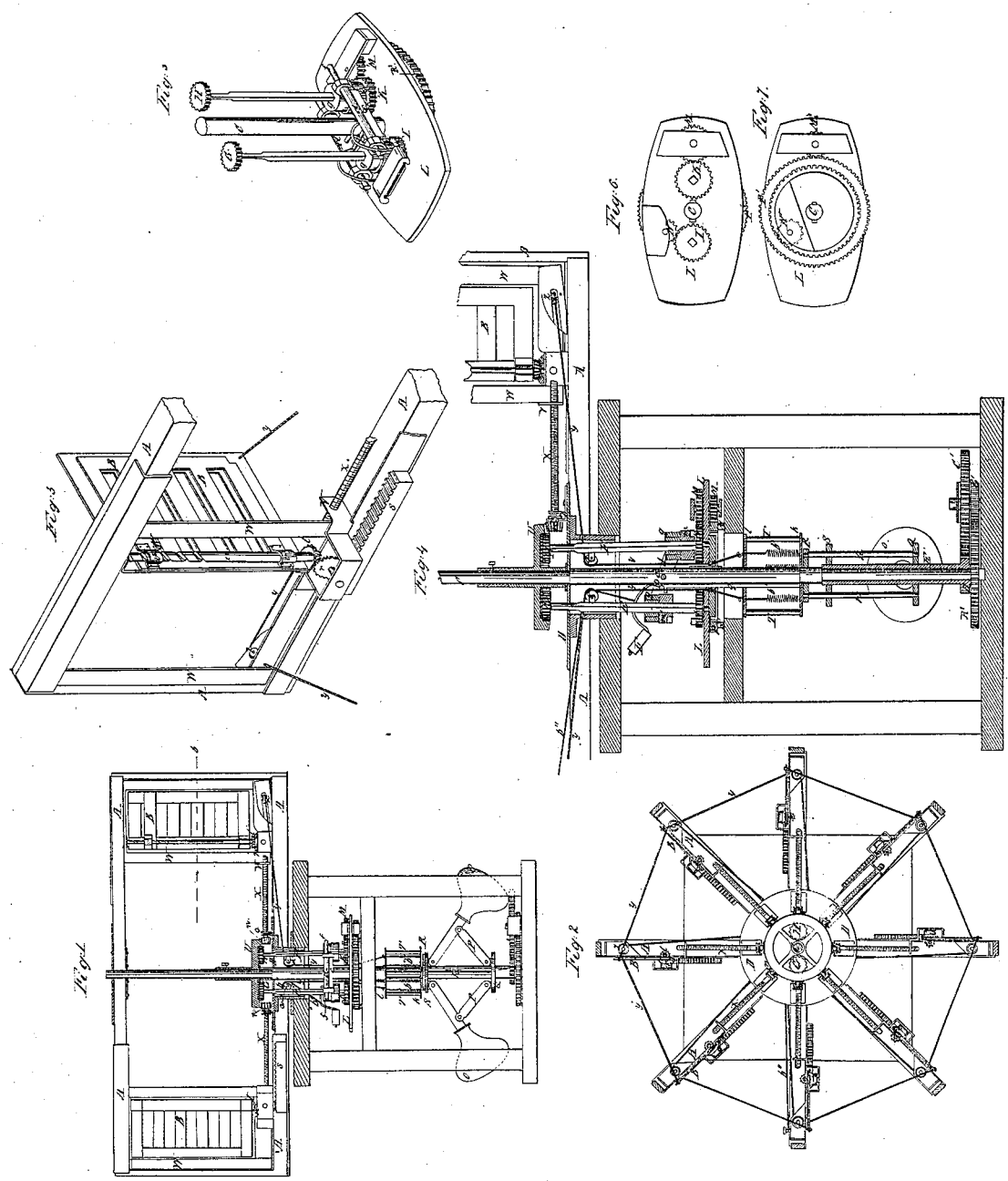

UNITED STATES PATENT OFFICE.

JEREMIAH BURNITE, OF PUSEYVILLE, PENNSYLVANIA, ASSIGNOR TO BURNITE & CLARK.

IMPROVED ARRANGEMENT AND COMBINATION OF MACHINERY FOR REGULATING VELOCITY OF WIND-WHEELS.

Specification forming part of Letters Patent No. 13,969, dated December 18, 1855.

*To all whom it may concern:*

Be it known that I, JEREMIAH BURNITE, of Puseyville, in the county of Lancaster and State of Pennsylvania, have invented certain new and useful Improvements in Self-Regulating Wind-Wheels; and I do hereby declare the following to be a full, clear, and exact description of the same, reference being had to the accompanying drawings, making a part thereof, in which—

Figure 1 represents a combined side and sectional view of a horizontal wind-wheel, together with its regulating apparatus; Fig. 2, a horizontal sectional view across the line $a$ $b$; Fig. 3, a detached perspective view of one arm of the wheel; Fig. 4, a vertical section of the regulating apparatus with the lower part of one arm and wing; Figs. 5, 6, and 7, detached views of details described hereinafter.

Similar letters refer to like parts in the different drawings.

The nature of this invention consists in combining a regulating apparatus in such a manner with the arms and wings of a horizontal wind-wheel as to produce a uniform motion, though the wind may be ever so variable, and that thus the wheel will make such a certain number of revolutions as may be required for any certain purpose.

A represents the frame of the wind-wheel, consisting of eight quadrangular-shaped frames, into each of which a wing B of sheet metal is fastened vertically and in such a manner as will be described hereinafter, the whole thus forming a horizontally-acting wind-wheel revolving on shaft C. A plate D is secured firmly to the lower horizontal arms of the frame A by means of bolts, thus revolving with the wheel. This plate is also secured firmly to the shaft C by means of keys. The square shafts E F play with the cylindrical parts of their shafts in the body of the plate D, Figs. 1 and 4, and are held firmly by the same. The cogged wheels G and H are secured firmly to the upper ends of said shafts; but the wheels I and K at the lower ends are only attached to them in such a manner that they can revolve freely and independently of the same. The shafts E and F rest with their lower ends in plate L, whose shape is represented in Figs. 6 and 7. It is also keyed to shaft C. When the wind-wheel revolves with the shaft C, the shafts E and F revolve around the shaft C without revolving on their own geometrical axes, and the wheels I and K would make the same motion, but being in gear with the cogged wheels M and N they are thus made to revolve at the same time around their own axes. These cogged wheels M and N are fixed on the plate, as shown in Figs. 5 and 6.

Fig. 7 shows the plate L as seen from below. The wheels M and M' are fixed on the same shaft. So are the wheels N and N'. The large wheel P', which is only a rim provided with cogs both on its inner and outer circumference and which has no arms, is stationary and rests on little pillars $o'$, Fig. 4. The wheels M' and N' play, respectively, round its outer and inner circumference, and the combination of these wheels, together with those in Fig. 6, serves to facilitate the double rotary motion of the wheels I and K and to keep the plate L from careening to one or the other side.

The following arrangement, serving to engage and disengage one or the other of the wheels I and K by means of clutches, is attached to the shaft C. A pin $e$, which is secured in and traverses the shaft C, horizontally holds on both its ends two cylindrically-shaped pieces $d$, whose ends play in hollow projections of the cylindrical pieces $g'$, which can slide up and down the shafts E and F whenever the pieces $d$ turn on the pin $e$ as their fulcrum. The inner part of the pieces $g$ can revolve with the shafts E and F. The outer cylindrical-shaped part can only move up and down, and is firmly connected with the clutches $m$ and $m'$.

When through a certain force of the wind the wind-wheel makes more revolutions in a certain time than it ought to make, then the regulating-balls O, by their centrifugal power, will rise, and thus by means of the links P they will raise the plate Q to the position shown in Fig. 4. The plate R is firmly connected with the plate Q by means of the rods $h$, which pass through holes in the disk S. Two other disks $k$ and $l$ are secured together firmly by means of the braces T. On the lower disk $k$ rests a vertical standing rod $q$, which passes through and is held by the upper disk $l$. When by the rising of the disk R the disks $k$ and $l$ are raised, the rod $q$ is raised with them at the same time, and striking with its head onto a cross-piece $p$, which connects the two cylinders $d$, it thus raises the piece $g'$, and with it the clutch $m'$, when at the same time it lowers $g$ and the clutch $m$. As seen in Fig. 4, the clutches $m$ and $m'$ are provided with recesses which correspond with a pin on the upper plane of the wheels I and K. As soon as clutch $m$ has gripped the pin of the wheel K it will revolve with it, and being fixed on the square shaft F it will cause that shaft to revolve in the same direction. Thus the wheel H will revolve with shaft F and will impart a revolving motion to the cogged wheel U. The wheel U is provided with cogs on its inner periphery, where it is acted upon by one of the wheels G or H. Besides these it is provided on its lower periphery with beveled cogs, which act on the small bevel-wheels $n$. There are eight of these bevel-wheels, as shown in Fig. 2, and each one is fixed onto a horizontal screw X, held by supports. These screws pass at V through projections of iron sliding frame W, inside of which the wings of the wind-wheel are suspended, and thus as soon as the bevel-wheels $n$ revolve they impart the same motion to the screws X, and thus move the sliding frame in a horizontal direction. We have supposed above that the wind-wheel was running too fast. By the action just described the sliding frames containing the wings have been moved inward toward shaft C, where their momentum and the power of the wind are smaller than when their distance from shaft C is enlarged, and thus they will relax their motion. During the movement just described the wings themselves also undergo a change. Each wing consists of two separate iron frames, one of which is movable on the shaft $u$, the other stationary and in no connection with said shaft, each having square openings of the same size, as shown in Fig. 3, which take an alternate position when the wind acts with its average force, and thus oppose one complete surface to the wind. When the screw X, Fig. 3, moves the sliding frame inward, the bevel-wheel $r$ is turned by running over the rack $s$. Thus the horizontal bevel-wheel $t$ is turned, which imparts the same motion to the shaft $u$. To this shaft $u$ the movable frames of the wing B are attached, as shown in Fig. 3, where two half-cylindrically-shaped pieces $v$ surround the shaft and are riveted to said wing. One of the pieces $v$ is pierced by a pin or screw which slides in a spiral groove of the shaft $u$. Thus when the shaft $u$ revolves, the pin, and with it the movable frame of the wing, slides up or down, so that the openings in the two frames after a certain movement correspond together, and thus the surface of the wing on which the wind can act will be reduced and the motion of the wing will also be retarded.

Besides the two motions just described, a third motion is imparted to the wings to regulate their speed. It will be seen from Fig. 2 that from each wing B a cord or chain passes over a roller Z, which is secured to the next windward arm of the wheel, thence it passes over roller $a'$, and thence down vertically, where it is attached to a spiral spring $b'$. These springs, by means of their elasticity, give to the rope $y$ sufficient play in case the velocity of the wheel deviates but very little from its average velocity and will compensate by allowing each wing to open to a small degree; but as soon as the velocity of the wheels is so great as to distend the regulating-balls O, and thus to raise the disks $k$ and $l$, the springs $b'$, which are attached to the disk $k$, will rise with it, the ropes $y$ will be slackened and the wing B opened and will take a position similar to the one shown in Fig. 3. Thus they will oppose but a small surface to the wind till the number of revolutions of the wheel will come down to the average number. Should after this the force of the wind decrease, then the regulating-balls O will fall down to their first position. The rod $q$ will consequently slide downward, leaving the cross-piece $p$ unsupported. The weight F' will then press down the clutch $m'$ till it grips the pin of the wheel I, and consequently a reverse motion of the above-described movement will take place, which will replace the wings B to the position indicated in Fig. 2 and shut at the same time the openings of the wings, thus presenting a close surface to the wind. It is necessary to arrest the sliding frames W, which are thus moved outward by means of the screws X at a certain point. To effect this, a rope $b''$ (marked on the drawings in red) is attached to one of the sliding frames W by means of a pin. Said rope runs over the roller $a'$ and is fastened to the arm of the weight F'. It has such a length that when the sliding frame W arrives at the extreme outward point it will raise the arm of the weight F', disconnect the clutch $m'$ from wheel I, thus bringing the regulating apparatus in a position (shown in Fig. 1) where both clutches $m$ an $m'$ are disconnected from their respective cog-wheels, and where it thus, with exception of the balls O, is at rest, as is required when the wind-wheel revolves with its average velocity.

It is obvious that the regulating-balls O must act instantly. Whenever any irregularity in the motion of the wind-wheel occurs for that purpose they must revolve constantly with a greater velocity than the wheel itself. To accomplish this, the driving-shaft C acts by means of a wheel A' on a pinion B', which revolves on the same shaft as the wheel C', and which in its turn acts on the pinion D'. The latter is attached to a hollow shaft E', to which the arms and links of the regulating-balls O are attached by means of bolts.

The entire regulating of the wind-wheel to and by the force of the wind is thus automatic and consequently self-regulating.

Having thus fully described the nature of my invention, what I claim therein as new, and desire to secure by Letters Patent, is—

1. Causing the vanes or sails to traverse automatically from or toward the center of the wind-wheel by means substantially such as herein described, and for the purposes set forth.

2. In connection with the centripetal and centrifugal traversing of the sails or vanes, the vertical adjustment of the same—viz., causing the double lattices of which the vanes are composed to expose more or less surface to the wind by making the slats of one cover more or less the openings in the other, substantially as herein described.

JEREMIAH BURNITE.

Witnesses:
WILLIAM MURPHY,
JOSEPH WHITESIDE.